(12) United States Patent
Ramamurthy et al.

(10) Patent No.: US 11,948,213 B2
(45) Date of Patent: Apr. 2, 2024

(54) METHOD AND SYSTEM FOR SEQUENCING ASSET SEGMENTS OF PRIVACY POLICY

(71) Applicant: Tata Consultancy Services Limited, Mumbai (IN)

(72) Inventors: Arun Ramamurthy, Pune (IN); Shree Nivas, Pune (IN); Mangesh Sharad Gharote, Pune (IN); Vijayanand Mahadeo Banahatti, Pune (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 610 days.

(21) Appl. No.: 17/158,850

(22) Filed: Jan. 26, 2021

(65) Prior Publication Data
US 2022/0101461 A1 Mar. 31, 2022

(30) Foreign Application Priority Data
Sep. 28, 2020 (IN) .............................. 202021042105

(51) Int. Cl.
*G06Q 50/16* (2012.01)
*G06F 40/279* (2020.01)
*G06F 40/40* (2020.01)

(52) U.S. Cl.
CPC ........... *G06Q 50/16* (2013.01); *G06F 40/279* (2020.01); *G06F 40/40* (2020.01)

(58) Field of Classification Search
CPC ....... G06Q 50/16; G06F 40/279; G06F 40/40; H04L 63/20
See application file for complete search history.

(56) References Cited

U.S. PATENT DOCUMENTS 8,326,767 B1 * 12/2012 Ramanujan ........... H04L 67/562
705/78
10,356,456 B2 7/2019 Ranjeet et al.
(Continued)

FOREIGN PATENT DOCUMENTS

CN 105718593 A * 6/2016 ......... G06F 16/2453
CN 106936765 A * 7/2017 ......... H04L 63/0407
(Continued)

OTHER PUBLICATIONS

Logan Lebanoff, "Automatic Detection of Vague Words and Sentences in Privacy Policies." 2018, Dept. of Computer Science, University of Central Florida, pp. 1-10. (Year: 2018).*
(Continued)

*Primary Examiner* — Tan D Nguyen
(74) *Attorney, Agent, or Firm* — FINNEGAN, HENDERSON, FARABOW, GARRETT & DUNNER LLP (57) ABSTRACT

The disclosure relates to sequencing of asset segments of privacy policies. The asset segments are sequenced based on a set of constraints. In an embodiment the asset segments are sequenced using a set of pre-defined predecessors and a set of pre-defined successors of each asset segment through a feasible sequence generation technique and a sequence generation technique based on the constraints, wherein the constraints are preferences associated with the source entity and the target entity. Hence the disclosure bridges a communication gap between the source entity and the target entity by optimally displaying the most relevant privacy policy (mapped to the asset segments) based on the constraints associated with the source entity and the target entity. Further the disclosed system also determines a violation factor that represents a conflict between the preferences associated with the source entity and the target entity.

10 Claims, 4 Drawing Sheets

(56) References Cited

U.S. PATENT DOCUMENTS

| | | | |
|---|---|---|---|
| 11,315,053 B1* | 4/2022 | Powell | G06Q 10/06313 |
| 2003/0088520 A1* | 5/2003 | Bohrer | G06Q 10/10 |
| | | | 705/74 |
| 2003/0112791 A1* | 6/2003 | Suryanarayana | H04L 67/02 |
| | | | 370/352 |
| 2009/0175422 A1* | 7/2009 | Marics | H04M 3/5116 |
| | | | 379/45 |
| 2011/0055585 A1* | 3/2011 | Lee | H04L 9/3218 |
| | | | 713/183 |
| 2015/0033305 A1* | 1/2015 | Shear | G06F 21/6218 |
| | | | 726/11 |
| 2016/0019339 A1* | 1/2016 | Sazonov | G16B 30/00 |
| | | | 702/20 |
| 2017/0146690 A1* | 5/2017 | Lee | G01V 20/00 |
| 2021/0288965 A1* | 9/2021 | Afroz | G06F 21/6245 |

FOREIGN PATENT DOCUMENTS

| | | | | |
|---|---|---|---|---|
| CN | 108596439 A | * | 9/2018 | G06Q 10/0635 |
| WO | WO-2018170504 A1 | * | 9/2018 | G06F 16/1805 |
| WO | WO2019/007477 A1 | | 1/2019 | |
| WO | WO2020/029235 A1 | | 2/2020 | |
| WO | WO-2020079287 A1 | * | 4/2020 | H04W 12/02 |

OTHER PUBLICATIONS

George Hatzivasilis, Review of Security and Privacy for the Internet of Medical Things (IoMT), 2019, 15th International Conference on Distributed Computing in Sensor Systems (DCOSS), pp. 457-463. (Year: 2019).*

Yingchen Yan, "Asymmetric Retailers with different moving sequences: Group buying vs. individual purchasing" 2017, European Journal of Operational Research, 261, pp. 903-917. (Year: 2017).*

Liu, Tiecheng et al., "Optimization Algorithms for the Selection of Key Frame Sequences of Variable Length", Computer Vision, Apr. 2002, pp. 403-417, Springer, https://link.springer.com/content/pdf/10.1007/3-540-47979-1_27.pdf.

* cited by examiner

METHOD AND SYSTEM FOR SEQUENCING ASSET SEGMENTS OF PRIVACY POLICY

The present application claims priority from Indian provisional application no. 202021042105, filed on Sep. 28, 2020.

TECHNICAL FIELD

The disclosure herein generally relates to a sequencing of assets and, more particularly, to a method and a system for sequencing asset segments of privacy policy.

BACKGROUND

Most online services available nowadays operate with terms and conditions that are text-based online "privacy policy" content, wherein the 'Privacy policy' statement discloses the practices carried out by an organization to gather, use and, share users' data. In the current digital era, reading and understanding privacy policies has become a critical issue with the advent of the European Union's much touted General Data Protection Regulation (GDPR) that emphasizes on "privacy by default". The GDPR places the onus on users to make the right decision with regards to their personal data processing by organizations and further the GDPR also sets rules for organizations to make the communication pertaining to personal data processing transparent, intelligible and concise using plain language.

Despite the GDPR and the requirement for reading-comprehending privacy policies, majority of users skip or ignore the privacy policy notices while joining a social network via internet for the first time, as the user may not be willing to read and/or comprehend the text-based online privacy policy content. While few users who try to read and/or comprehend the text-based privacy policies struggle to grasp them, as the text-based online privacy policy content is usually lengthy and complex. Further the online privacy policies often contain ambiguous language that undermines the purpose and value of the privacy policies for end users. Hence the effective communication of privacy policies from the online service to a user remains challenging due to verbosity, legal jargon, complexity and lack of comprehensibility.

The challenges in effective communication of privacy policies from the online service to a user has motivated organizations to reconsider and rewrite their privacy policies in other legible formats/interesting formats that may be user-friendly and grasp the interest of the reader. Additionally, in certain scenarios organizations/online services may be interested in certain specific contents of the privacy policy, the users may be may be interested in another set of specific contents of the privacy policy, while there may be certain specific content that are relevant and important for both user and organizations/online services. Here, it is very important to optimize the interests of the organizations/online services and the users, while communicating the privacy policies.

SUMMARY

Embodiments of the present disclosure present technological improvements as solutions to one or more of the above-mentioned technical problems recognized by the inventors in conventional systems. For example, in one embodiment, a method for sequencing asset segments of privacy policy is provided. The method includes receiving an input associated with a privacy policy of a source entity, the input comprising of a plurality of asset segments and a plurality of constraints, wherein the plurality of constraints comprises one or more preferences associated with the source entity and one or more preferences associated with a target entity. Further, the method includes generating a feasible sequence for the plurality of asset segments, through a feasible sequence generation technique based the one or more preferences associated with the source entity, a set of pre-defined predecessors of each asset segment and a set of pre-defined successors of each asset segment, where the feasible sequence comprises one or more sub-sequences, wherein the feasible sequence generation technique comprises of: generating a set of revised predecessors for each of the asset segment and a set of revised successors for each of the asset segment using the pre-defined predecessors of the plurality of asset segments, the set of pre-defined successors of the plurality of asset segments and the one or more preferences associated with the source entity based on a predecessor and successor generation technique; and generating a set of feasible sequences for the plurality of asset segments using the set of revised predecessors, the set of revised successors and the one or more preferences associated with the source entity based a feasible sequence technique. Also, the method includes generating a final sequence for the plurality of asset segments, through a sequence generation technique using the feasible sequences based on the one or more preferences associated with the target entity and the one or more preferences associated with the source entity.

In another aspect, a system for sequencing asset segments of privacy policy is provided. The system includes a memory storing instructions, one or more communication interfaces; and one or more hardware processors coupled to the memory via the one or more communication interfaces, wherein the one or more hardware processors are configured by the instructions for receiving an input associated with a privacy policy of a source entity, the input comprising of a plurality of asset segments and a plurality of constraints, wherein the plurality of constraints comprises one or more preferences associated with the source entity and one or more preferences associated with a target entity. The one or more hardware processors are further configured by the instructions for generating a feasible sequence for the plurality of asset segments, through a feasible sequence generation technique based the one or more preferences associated with the source entity, a set of pre-defined predecessors of each asset segment and a set of pre-defined successors of each asset segment, where the feasible sequence comprises one or more sub-sequences, wherein the feasible sequence generation technique comprises of: generating a set of revised predecessors for each of the asset segment and a set of revised successors for each of the asset segment using the pre-defined predecessors of the plurality of asset segments, the set of pre-defined successors of the plurality of asset segments and the one or more preferences associated with the source entity based on a predecessor and successor generation technique; and generating a set of feasible sequences for the plurality of asset segments using the set of revised predecessors, the set of revised successors and the one or more preferences associated with the source entity based a feasible sequence technique. Furthermore, the one or more hardware processors are further configured by the instructions for generating a final sequence for the plurality of asset segments, through a sequence generation technique using the feasible sequences based on the one or more preferences associated with the target entity and the one or more preferences associated with the source entity.

Another embodiment provides a non-transitory computer-readable medium having embodied thereon a computer program for a computer readable program, wherein the computer readable program, when executed by one or more hardware processors, causes sequencing asset segments of privacy policy is provided. The program includes receiving an input associated with a privacy policy of a source entity, the input comprising of a plurality of asset segments and a plurality of constraints, wherein the plurality of constraints comprises one or more preferences associated with the source entity and one or more preferences associated with a target entity. Further, the program includes generating a feasible sequence for the plurality of asset segments, through a feasible sequence generation technique based the one or more preferences associated with the source entity, a set of pre-defined predecessors of each asset segment and a set of pre-defined successors of each asset segment, where the feasible sequence comprises one or more sub-sequences, wherein the feasible sequence generation technique comprises of: generating a set of revised predecessors for each of the asset segment and a set of revised successors for each of the asset segment using the pre-defined predecessors of the plurality of asset segments, the set of pre-defined successors of the plurality of asset segments and the one or more preferences associated with the source entity based on a predecessor and successor generation technique; and generating a set of feasible sequences for the plurality of asset segments using the set of revised predecessors, the set of revised successors and the one or more preferences associated with the source entity based a feasible sequence technique. Also, the program includes generating a final sequence for the plurality of asset segments, through a sequence generation technique using the feasible sequences based on the one or more preferences associated with the target entity and the one or more preferences associated with the source entity.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Glossary

Most online services available nowadays operate with terms and conditions that are text-based online "privacy policy" content, wherein the 'Privacy policy' statement discloses the practices carried out by an organization to gather, use and, share users' data. Existing methods for design of online privacy statements include platforms for privacy statements and role of purpose in privacy requirements. Most of the privacy statements includes a large amount of content in common which can be categorized in broader sections. Further, the privacy policies contain incomplete and ambiguous information flow statements. Besides that, language and terms used in the privacy policies obviate the end users from reading the large textual content for understanding in context of their requirement. Thus, the typical text-based privacy policies poses challenges, such as ineffectiveness of text-based privacy policy statements, lack of comprehensibility to average user, issue of non-inclusiveness in light of increasing demographic variance, and so on. Owing to the above challenges a user may not read through the policy, however important it is for him/her to know about it.

Video is considered to be an effective medium for technical assistance and delivering information. An audio-visual medium may be a user friendly and widely accepted medium of communication. Selecting animation-based visuals as an alternative for delivering text-based content raises user motivation, improves communication and expands potential for deeper understanding of the subject concepts. Hence displaying the private policies to a user as a video may be more efficient compared to text-based private policies. Additionally, in certain scenarios organizations/online services may be interested in certain specific contents of the privacy policy, the users may be interested in another set of specific contents of the privacy policy, while there maybe certain specific content that are relevant and important for both user and organizations/online services. Here, it is very important to strike/decide/optimize the right balance between the interests of the organizations/online services and the users, while communicating the privacy policies. The private policy can be further divided into several sub-policies, each of which may comprise several sub-topics An example of the asset segments privacy policies along with the corresponding sub-asset segments for each asset segment is described in TABLE 1. Herein, it will be understood that the example provided in table 1 is only for illustrative purposes and should not be construed as limiting to the embodiments.

TABLE 1

Example of asset segments of privacy policy
with corresponding sub-asset segments

| Asset segments of Privacy Policy | Sub-asset segments |
|---|---|
| Cookies | What are Cookies? |
| | Disabling Cookies |
| | Features enabled by Cookies |
| | Do we store Cookies? |
| | How Cookies are stored? |
| Personal Information | Need of collecting PII |
| | Different types of PII collected |
| | How we collect PII? |
| | What is personally identifiable information PII? |
| Children's Policies | Can children access the services? |
| | Advertisement specifications for children |
| | Parents' consent requirements |
| | Parent monitoring |
| | Services available for children |
| | Minimum age requirement |

An example of the asset segments privacy policies with constraints that include a plurality of organization preferences and a plurality of user preferences is described below under two sections titled organization preference and user preference:

Organization Preference:

In cookies asset segment, organization prefers the sub-asset segment "What are Cookies?" to be sequenced before other sub-assets. Similarly, organization also prefers to: a) Sequence sub-asset "Do we store cookies?" before sub-asset "Features enabled by Cookies" and b) Sequence sub-asset "Features enabled by Cookies" before sub-asset "How Cookies are stored?".

In personal information asset segment, organization prefers the sub-asset segment "What is personally identifiable information PII?" to be sequenced before other sub-assets.

In children's policies asset segment, organization prefers the sub-asset segments "Can children access the services?" and "Minimum age requirement" to be sequenced before other sub-assets.

Further the organization prefers to sequence the "Personal Information" asset segment before other segments and to sequence the "Privacy Shield" asset segment after other segments.

Also, the organization prefers to sequence "Information Sharing" and "Information Security" before "Third Party Advertisers".

User Preferences:

In cookies asset segment, the user prefers to view "Disabling Cookies" sub-asset first since he/she is interested in knowing how to disable cookies.

In personal information asset segment, the user prefers to view "Need of collecting PII" and "Different types of PII collected" before other sub-asset segments since he/she is interested in knowing what information is collected from him/her and how the collected information is used.

In children's policies asset segment, the user prefers to view "Parents' consent requirements" and "Parent monitoring" before other sub-asset segments since he/she is interested in knowing the role of parents.

Further the user prefers to view "Children's Policies" before other asset segments.

In an experimental scenario, a study was performed to determine the preference of displaying the privacy policies of different organizations ranging from e-Commerce, retail, technology, entertainment, banking and finance as shown in below TABLE 2. Herein, it will be understood that the example provided in TABLE 2 is only for illustrative purposes and should not be construed as limiting to the embodiments.

TABLE 2

Example of different organizations across several domains

| Domains | | | | | | | |
|---|---|---|---|---|---|---|---|
| Entertainment | | | Banking | | | E-retail | |
| Netflix | Hotstar | Amazon | ICICI | SBI | HSBC | Flipkart E-Bay | Amazon |

For experiment purpose the content of the privacy policies of the different organizations can be categorized into distinct sections with similar agendas. Nine categories are labelled/identified with a position from A to I for identifying the sequence in each of the privacy policy as shown in the TABLE 3. Herein, it will be understood that the example provided in TABLE 3 is only for illustrative purposes and should not be construed as limiting to the embodiments.

TABLE 3

Example of categorization of contents of privacy policy

| Categorization | |
|---|---|
| Personal information | A |
| Cookies | B |
| Information Sharing | C |
| Information Security | D |
| Third Party Advertisers | E |
| Accessible information | F |
| Customer Choices | G |
| Children's privacy | H |
| Privacy Shields | I |

Each privacy policy was analyzed, and a sequence was identified by relating the occurrence of content from text-based policy to the categories mentioned above in TABLE 4. Herein, it will be understood that the example provided in TABLE 4 is only for illustrative purposes and should not be construed as limiting to the embodiments.

TABLE 4

Example of sequence of categorized contents of privacy policy

| Entertainment | | | Banking | | | E-retail | | |
|---|---|---|---|---|---|---|---|---|
| Netflix | Hotstar | Amazon | ICICI | SBI | HSBC | Flipkart | E-Bay | Amazon |
| F | F | A | A | A | D | A | D | A |
| A | A | B | D | B | E | B | A | B |
| C | E | C | F | C | B | C | I | C |
| E | C | D | G | D | G | D | E | D |
| G | G | E | I | E | A | G | C | E |
| I | H | F | C | F | C | E | F | F |
| D | D | G | E | G | F | F | G | G |
| H | B | H | B | I | I | I | B | H |
| B | I | I |   | H |   |   |   | I |

Based on the above table. 4, it can be inferred that privacy policies in some domains such as banking do not contain specific information related to children's Privacy Policies out of 6 policies combining Banking and e-Retail domains, 4 policies do not contain category H—Children's Privacy Policy. Based on the experiment, it can concluded that sequence is not consistent for different privacy policies within and outside domains as well and is definitely very different for different stakeholders like the organization and users. Hence this creates a technical problem of sequencing the asset segments to satisfy the real-time preference of several stakeholders for dynamically changing policies.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
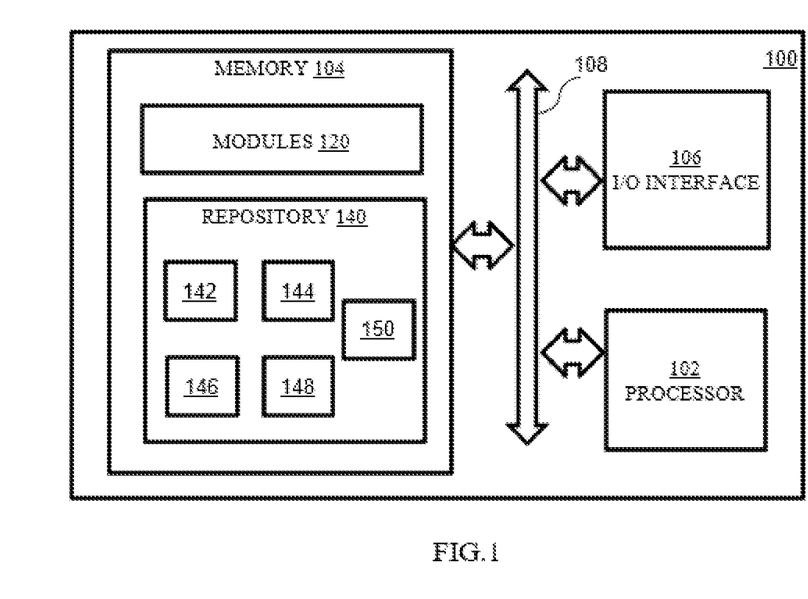
FIG. 1 illustrates a block diagram of a system for sequencing asset segments of privacy policy, according to some embodiments of the present disclosure.

FIG. 1 illustrates a block diagram of a system 100 for sequencing asset segments of privacy policy, according to some embodiments of the present disclosure. The disclosed system 100 determines an optimal sequence/arrangement of a plurality of asset segments associated with a privacy policy of an entity or an organization.

In an embodiment, the system 100 determines an optimal sequence/arrangement of a plurality of asset segments of a source entity based on a plurality of preferences associated with a source entity and a target entity. The 'source entity' may refer to an organization or a concerned individual representative from the organization and 'target entity' may refer to an organization or another concerned individual representative that are distinct from the source entity. In an example scenario, the plurality of asset segments comprising of audio or video snippets or audio-video sequence of the source entity are sequenced in an optimal order based on the source entity preferences and the target entity preferences.

In another embodiment, the system 100 determines an optimal sequence/arrangement of a plurality of asset segments of the organization based on a plurality of constraints or preferences associated with the organization as well as viewers or end users of the privacy policy. In an example scenario, the plurality of asset segments comprising of audio or video snippets are sequenced in an optimal order based on the organization preferences and an user preferences, wherein the 'user' may refer to another organization or a concerned individual representative from the organization.

When an input associated with a privacy policy of a source entity is provided as an input, the system 100 optimally sequences the input based on the source entity preferences and the target entity preferences, wherein the input comprises of a plurality of asset segments and a plurality of constraints. The asset segments are optimally re-sequenced through a set of sequence generation techniques that include a feasible sequence generation technique and a sequence generation technique based on the source entity preferences and the target entity preferences.

Hence the present disclosure determines an optimal sequence/arrangement of a plurality of asset segments associated with a privacy policy of an organization. The optimal sequence/arrangement of the plurality of asset segments is determined based on a plurality of constraints or preferences associated with the source entity/organization of the privacy policy and the target entity/organization/individual who views/uses the privacy policy. The asset segment thus sequenced according to preferences of the source entity and the target entity may represent an alternative for the online text-based privacy policy statement. Hence the present disclosure bridges a communication gap between privacy policy to the end users over long text-based policy statements by displaying the most relevant privacy policy (mapped to asset segments) in an optimal sequence by considering the constraints or preferences associated with the organization as well as end users. The proposed sequencing techniques are based on or inspired by greedy algorithm.

The system 100 includes or is otherwise in communication with one or more hardware processors such as a processor 102, at least one memory such as a memory 104, and an I/O interface 106. The processor 102, memory 104, and the I/O interface 106 may be coupled by a system bus such as a system bus 108 or a similar mechanism. The I/O interface 106 may include a variety of software and hardware interfaces, for example, a web interface, a graphical user interface, and the like The interfaces 106 may include a variety of software and hardware interfaces, for example, interfaces for peripheral device(s), such as a keyboard, a mouse, an external memory, a camera device, and a printer. Further, the interfaces 106 may enable the system 100 to communicate with other devices, such as web servers and external databases. The interfaces 106 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 106 may include one or more ports for connecting a number of computing systems with one another or to another server computer. The I/O interface 106 may include one or more ports for connecting a number of devices to one another or to another server.

The hardware processor 102 may be implemented as one or more microprocessors, microcomputers, microcontrollers, digital signal processors, central processing units, state machines, logic circuitries, and/or any devices that manipulate signals based on operational instructions. Among other capabilities, the hardware processor 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 120 and a repository 140 for storing data processed, received, and generated by one or more of the modules 120. The modules 120 may include routines, programs, objects, components, data structures, and so on, which perform particular tasks or implement particular abstract data types.

The repository 140, amongst other things, includes a system database 142 and other data 144, 146 and 148. The other data 144, 146 and 148 may include data generated as a result of the execution of one or more modules in the other modules 130. In an embodiment, the repository 140 may include a privacy policy (PP) repository, a asset segment repository and a constraints repository. The PP repository may include a plurality of privacy policy obtained from the source entity, which is dynamic and is updated at real time with the current privacy policy of the source entity/organization/online services, wherein each asset segment is mapped to the privacy policy of the source entity. The asset segment repository may include a plurality of video templates or video snippets or audio templates or audio snippets or audio-video snippets or audio-video templates in various formats. The constraints repository may include a plurality of constraints, wherein the plurality of constraints comprises of one or more preferences associated with the source entity and one or more preferences associated with the target entity.

Figure 2:
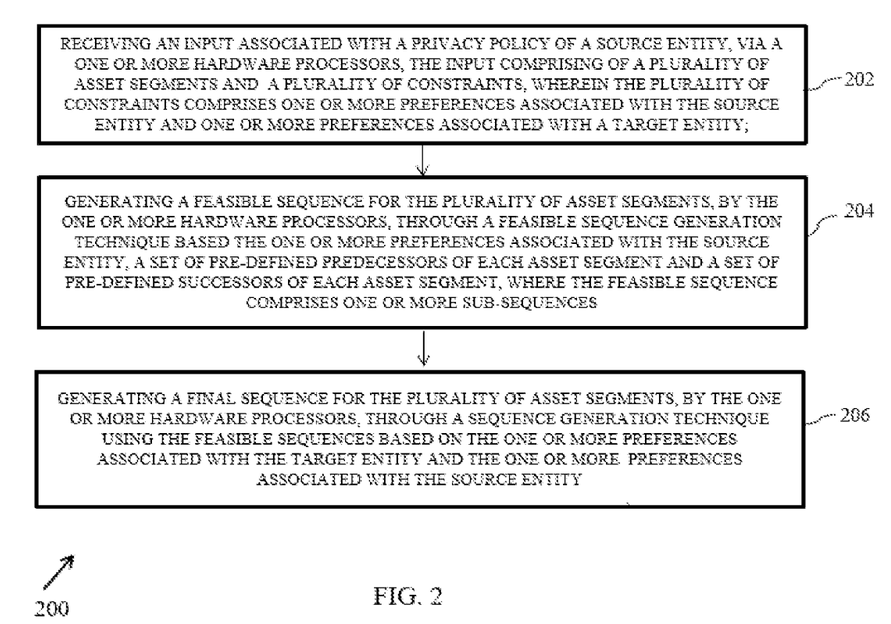
FIG. 2 is a flow diagram of a method for sequencing asset segments of privacy policy according to some embodiments of the present disclosure.

Referring to FIG. 2, a flow diagram of a method 200 for sequencing asset segments of privacy policy is described in accordance with an example embodiment. The method 200 depicted in the flow chart may be executed by a system, for example, the system, 100 of FIG. 1. In an example embodiment, the system 100 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 100. However, the operations of the method 200 can be described and/or practiced by using any other system.

At 202 of the method 200, the system 100 receives an input associated with a privacy policy of a source entity, via a one or more hardware processors. The input includes a plurality of asset segments and a plurality of constraints, wherein the plurality of constraints includes one or more preferences associated with the source entity and one or more preferences associated with a target entity.

In an embodiment, the plurality of asset segment includes of one of a set of audio-video templates, a set of audio templates and a set of video template, wherein each asset segment is mapped to the privacy policy of the source entity. The privacy policy associated with the source entity may include one or more of, for example, a text document (such as PDF, .txt document, .word document, and so on), a weblink to the text based policy and so on and the source entity is a 'source entity' that refers to an organization or a concerned individual representative from the organization. Herein, the target entity may be an organization for which the asset segments have to be re-sequenced based on the target entity preferences, while also considering the source entity preferences.

In an example embodiment, the organization of source entity/target entity may belong to various sectors including, but not limited to, e-Commerce, retail, technology, entertainment, banking and finance. The organizations may further have varying degrees of their overall popularity, worldwide recognition, use and overall asset evaluation. Further the target entity and the plurality of users may include but are not limited to organization(s) similar to organization under consideration, employees of said organization(s), or users accessing website of such organization(s).

In an embodiment, the privacy policies content can be classified into various sections. For instance, the privacy policies may include content classified into various asset segments including, but not limited to Collection of Information, Security, Sharing, User Choices, Cookies and so on. Each of the asset segments comprises of sub-asset segments of the PP and is assigned a position, wherein the position in a sequence is the order of display of the plurality of the asset segments as it is displayed to a source entity or a target entity. Examples of asset segment may include, but are not limited to, personal information, Cookies, information sharing, information security, third party advertisers, accessible Information, customer choices, children privacy policies, and privacy shield. An example of the asset segment along with the corresponding sub-asset segments of privacy policy is described in TABLE 5. Herein, it will be understood that the example provided in TABLE 5 is only for illustrative purposes and should not be construed as limiting to the embodiments.

TABLE 5

Example of asset segments with sub-asset segments of privacy policy

| Asset segments of Privacy Policy | Sub-asset segments |
|---|---|
| Cookies | What are Cookies? |
|  | Disabling Cookies |
|  | Features enabled by Cookies |
|  | Do we store Cookies? |
|  | How Cookies are stored? |
| Personal Information | Need of collecting PII |
|  | Different types of PII collected |
|  | How we collect PII? |
|  | What is personally identifiable information PII? |

TABLE 5-continued

Example of asset segments with sub-asset segments of privacy policy

| Asset segments of Privacy Policy | Sub-asset segments |
|---|---|
| Children's Policies | Can children access the services?<br>Advertisement specifications for children<br>Parents' consent requirements<br>Parent monitoring<br>Services available for children<br>Minimum age requirement |

In an embodiment, the one or more preferences associated with the source entity includes a plurality of source entity user preference. In an embodiment, the one or more preferences associated with a target entity comprises a plurality of target entity user preference.

An example of the asset segments privacy policies with constraints that include one or more preferences associated with the source entity and one or more preferences associated with a target entity is described below under two sections titled source entity preference and target entity preference:

Source Entity Preference:
In cookies asset segment, source entity prefers the sub-asset segment "What are Cookies?" to be sequenced before other sub-assets. Similarly, source entity also prefers to: a) Sequence sub-asset "Do we store cookies?" before sub-asset "Features enabled by Cookies" and b) Sequence sub-asset "Features enabled by Cookies" before sub-asset "How Cookies are stored?".
In personal information asset segment, source entity prefers the sub-asset segment "What is personally identifiable information PII?" to be sequenced before other sub-assets.
In children's policies asset segment, source entity prefers the sub-asset segments "Can children access the services?" and "Minimum age requirement" to be sequenced before other sub-assets.
Further the source entity prefers to sequence the "Personal Information" asset segment before other segments and to sequence the "Privacy Shield" asset segment after other segments.
Also, the source entity prefers to sequence "Information Sharing" and "Information Security" before "Third Party Advertisers".

Target Entity Preferences:
In cookies asset segment, the target entity prefers to view "Disabling Cookies" sub-asset first since he/she is interested in knowing how to disable cookies.
In personal information asset segment, the target entity prefers to view "Need of collecting PII" and "Different types of PII collected" before other sub-asset segments since he/she is interested in knowing what information is collected from him/her and how the collected information is used.
In children's policies asset segment, the target entity prefers to view "Parents' consent requirements" and "Parent monitoring" before other sub-asset segments since he/she is interested in knowing the role of parents.
Further the target entity prefers to view "Children's Policies" before other asset segments.

In an example, the input includes the plurality of asset segments and the plurality of constraints, wherein the plurality of constraints comprises one or more preferences associated with the source entity and one or more preferences associated with a target entity which is expressed as shown below:

A→Assets segments to be sequenced
$\beta_{ij}$→one or more preferences associated with the source entity
$\alpha_{ij}$→one or more preferences associated with the target entity Here $\beta_{ij}$ takes value 1 if source entity dictates asset i to be sequenced before j & $\alpha_{ij}$ takes value 1 if user prefers asset i to be sequenced before j.

At 204, the method 200 includes generating a feasible sequence for the plurality of asset segments, by the one or more hardware processors. The feasible sequence is generated through a feasible sequence generation technique based the one or more preferences associated with the source entity, a set of pre-defined predecessors of each asset segment and a set of pre-defined successors of each asset segment. The generated feasible sequence comprises one or more sub-sequence.

In an embodiment, the set of pre-defined predecessors (ppre[ ]) and the set of pre-defined successors (psuc[ ]) is dynamically pre-defined for each input asset based on the one or more preferences associated with the source entity, wherein the set of pre-defined predecessors (ppre[ ]) and the set of pre-defined successors (psuc[ ]) are associated with the order in which each input asset is sequenced or positioned among the plurality of asset segments.

Figure 3:
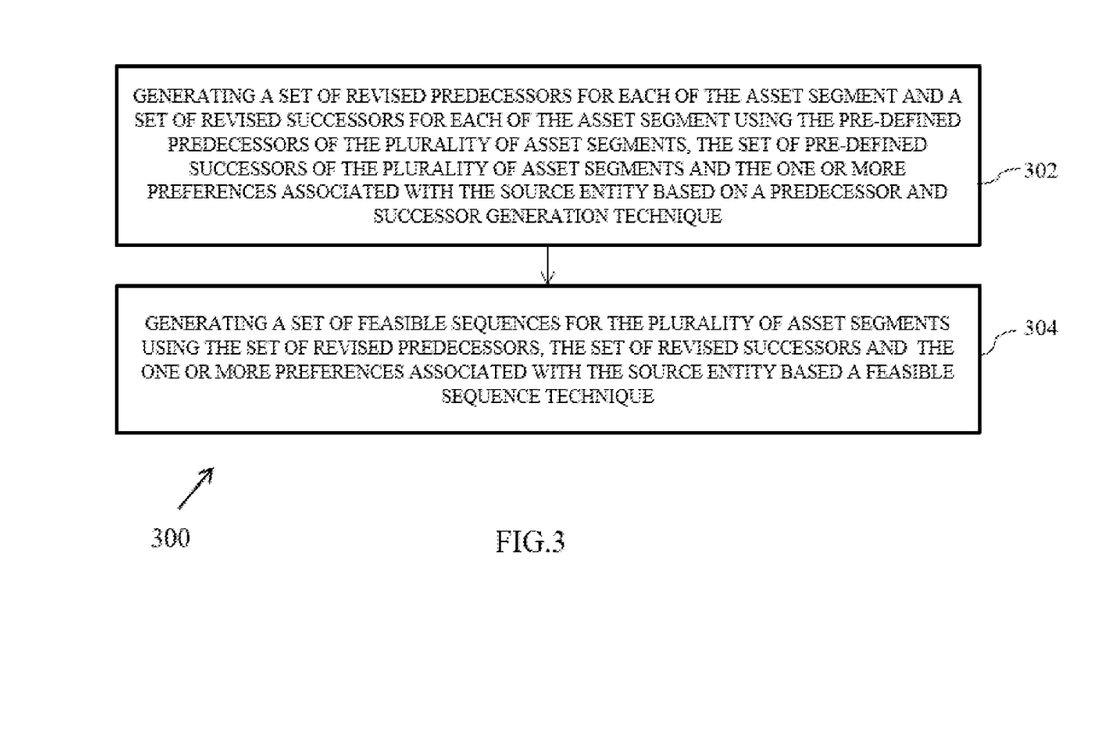
FIG. 3 illustrates a flow diagram of a method for feasible sequence generation technique to obtain a feasible sequence for sequencing asset segments of privacy policy, in accordance with an example embodiment of the disclosure.

The feasible sequence generation technique will be explained below with reference to the flow chart as illustrated in FIG. 3. Referring to FIG. 3, basic sequence generation technique is illustrated in accordance with an example embodiment wherein:

At 302 of the method 300 includes generating a set of revised predecessors (pre[ ]) for each of the asset segment and a set of revised successors (suc[ ]) for each of the asset segment using the pre-defined predecessors (ppre[ ]) of the plurality of asset segments. The set the pre-defined successors (psuc[ ]) of the plurality of asset segments and the one or more preferences associated with the source entity based on a predecessor and successor generation technique.

Figure 4:
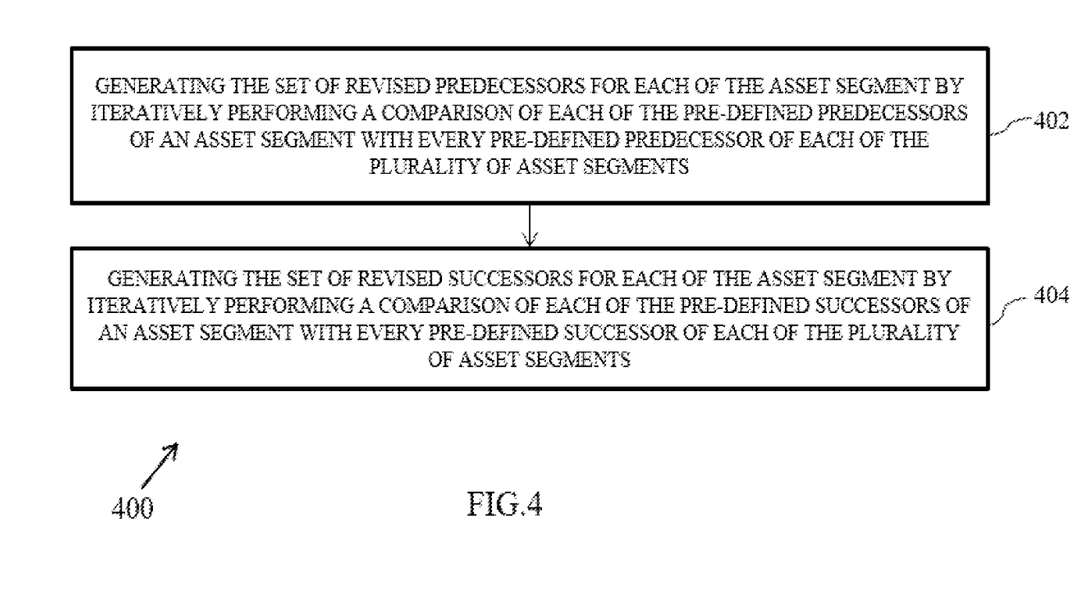
FIG. 4 illustrates a flow diagram of a method predecessor and successor generation technique to obtain a set of revised predecessors and a set of revised successors for sequencing asset segments of privacy policy, in accordance with an example embodiment of the disclosure.

In an embodiment, the predecessor generation technique and the successor generation technique will be explained below with reference to the flow chart as illustrated in FIG. 4.

At 402 of the method 400, includes generating the set of revised predecessors for each of the asset segment by iteratively performing a comparison of each of the pre-defined predecessors (ppre[ ]) of an asset segment with every pre-defined predecessor of each of the plurality of asset segments.

In an embodiment, a temporary set of predecessors (pre'[ ]) are created by iterating over all predecessors of i (loop over p), and predecessors of asset segment p to (pre'[i]) which can be expressed as shown below:

```
\begin{algorithm]
\normalsize
\textbf{Input: }
{\begin{itemize}
    \item \textit{A} - Set of assets
    \item $pre[ ]$
 - Set of predecessors for each asset based on dependencies
\end{itemize} } \\
\textbf{Output: }{Full set of predecessors}\\
\While{no change in $pre[ ]$ for each asset}
{
```

```
\For{each asset $i \in A$}
{
  \State{$pre'[i] = pre[i]$}\\
  \For{each asset $p \in pre[i]$}
  {
    \State{$pre'[i] = pre'[i] \cup pre[p]$}\\
  } }
  \For{each asset $i \in A$}
  {
    \State{$pre[i] = pre'[i]$}\\
  } }
\end{algorithm}
```

The iteration terminates once the set of revised predecessors list does not change for any asset segment in successive iterations.

At 404 of the method 400, includes generating the set of revised successors for each of the asset segment by iteratively performing a comparison of each of the pre-defined successors of an asset segment with every pre-defined successor of each of the plurality of asset segments.

In an embodiment, a temporary set of successors (suc'[ ]) are created by iterating over all successors of i (loop over p), and successors of asset segment p to (suc'[i]) which can be expressed as shown below:

```
\begin{algorithm}
\normalsize
\textbf{Input: }
{\begin{itemize}
  \item \textit{A} - Set of assets
  \item $suc[ ]$
  - Set of successors for each asset based on dependencies
\end{itemize} } \\
\textbf{Output: }{Full set of successors for each asset}\\
\While{no change in $suc[ ]$ for each asset}
{
  \For{each asset $i \in A$}
  {
    \State{$suc'[i] = suc[i]$}\\
    \For{each asset $s \in suc[i]$}
    {
      \State{$suc'[i] = suc'[i] \cup suc[s]$}\\
    } }
    \For{each asset $i \in A$}
    {
      \State{$suc[i] = suc'[i]$}\\
    } }
\end{algorithm}
```

The iteration terminates once the set of revised successors list remains unchanged for any asset segment in successive iterations.

Referring back to FIG. 3 wherein at 304 of the method 300, includes generating a set of feasible sequences for the plurality of asset segments using the set of revised predecessors, the set of revised successors and the one or more preferences associated with the source entity based a feasible sequence technique.

In an embodiment, the feasible sequence technique of the plurality of asset segments comprises generating one or more subsequence, wherein a subsequence of the one or more subsequences comprises the plurality of asset segments sequenced according to the revised predecessors and the revised successors, wherein the revised predecessors and the revised successors represents the one or more preferences associated with the source entity. The generated feasible sequence (s) can be presented as follows:

$$S = U_{i=1}^{K} s[k]$$

where K is the number of subsequences and s[k] is the $k^{th}$ subsequence

In an embodiment, the feasible sequence technique comprises of several sub-steps that first includes the sub-step of creating a subsequence and iteratively including the plurality of asset segments into the created subsequence based on the set of revised predecessors (pre[ ]) and the set of revised successors (suc[ ]).

In an embodiment, the feasible sequence technique is explained in the description below by considering an example of an asset segment (i) from the plurality of asset segments which is not a part of a subsequence. For asset segment (i) include the set of revised predecessors (pre[ ]) of i to the subsequence and then append asset segment (i) to the subsequence. Further include the set of revised successors (suc[ ]) of asset i are includes to the subsequence. However in case a asset segment (i) is a part of an existing subsequence (k), then the set of revised predecessors (pre [ ]) and the set of revised successors (suc[ ]) are individually checked to ensure that all the set of revised predecessors (pre [ ]) and the set of revised successors (suc[ ]) of i are correctly place in subsequence k. Further the set of revised predecessors (pre[ ]) and the set of revised successors (suc[ ]) are iteratively sequenced wherein: if asset j is not in the subsequence, then asset j is included before asset i in the subsequence or if asset j is sequenced before i in the subsequence, the sequence is retained without any modifications or else if asset j is sequenced after i in the subsequence, asset i is moved/re-sequenced before j in the subsequence. The algorithm for the feasible sequence technique for generating the feasible sequence (s) can be presented as shown below:

```
\begin{algorithm}
\normalsize
\textbf{Input: }
{\begin{itemize}
\item \textit{A} - Set of assets
\item $pre[ ]$
- Set of predecessors for each asset based on dependencies
\item $suc[ ]$ - Set of successors for each asset based on dependencies
\end{itemize} } \\
\textbf{Output: }{A feasible sequence}\\
\State{Use the full predecessor and successor generation algorithm to update $pre[ ]$
  and $suc[ ]$}\\
\State{Set of feasible subsequences $s = \{\}$ } \\
\For{each asset $i \in A$}
{
\If{i $\notin$ any of the subsequences}
{
\State{Create a new subsequeuce}\\
```

-continued

```
\State{$seq_{new} = pre[i]$}\\
\State{$seq_{new} = seq_{new}.append(i)$}\\
\State{$seq_{new} = seq_{new}.append(suc[i])$}\\
\State{$s = s \cup seq_{new}$}
}
\Else
{
\State{Let $i$ be present in subsequent $k$ represented as $s[k]$}\\
\For{$j \in pre[i]$}
{
\If{$j \notin s[k]$}
{
\State{Insert $j$ before $i$ in $s[k]$}
}
\Else
{
\If{$j$ appears before $i$ in $s[k]$}
{
\State[-do nothing-]
}
\Else
{
\State{move $i$ after $j$}
}}}
\For{$j \in suc[i]$}
{
\If{$j \notin s[k]$}
{
\State{Insert $j$ after $i$ in $s[k]$}
}
\Else
{
\If{$j$ appears after $i$ in $s[k]$}
{
\State{-do nothing-}
}
\Else
{
\State{move $i$ before $j$}
}}}}}
\end{algorithm}
```

Referring back to FIG. 2, at 206 of the method 200, the method includes generating a final sequence for the plurality of asset segments, by the one or more hardware processors, through a sequence generation technique using the feasible sequences based on the one or more preferences associated with the target entity and the one or more preferences associated with the source entity.

In an embodiment, the sequence generation technique wherein each of the subsequence of the feasible sequence is re-sequenced or merged with another subsequence based on the target entity user preference. The sequence generation technique is explained in this description. As seen the input for the sequence generation technique includes the feasible sequence (s), the one or more preferences associated with the target entity ($\alpha_{ij}$) and the one or more preferences associated with the source entity ($\beta_{ij}$) and the output of the sequence generation technique is the final sequence (F).

In an embodiment, consider an example of a feasible sequence (s) with two sequences s[k1] and s[k2] representing a subsequence in for assets segment i and j. The sequence generation technique starts with an iterating the feasible sequence over the one or more preferences associated with the target entity ($\alpha_{ij}$), wherein (i,j)∈U indicates that target entity prefers to view asset i before asset j. Hence based on the target entity prefers if s[k1] and s[k2] are different, that is if i and j are in different subsequences, then all the asset segments in k2 are sequenced immediately after k1. However if s[k1] and s[k2] are same, then the sequence of asset segment i is sequenced before or after j in the subsequence, while if asset i is sequenced before j then the feasible sequence is maintained without any modifications. Further if the asset segment i is sequenced after the asset segment j, then the asset segments i and the asset segment j is re-sequenced to assess if the user preference can be met. Further the feasible sequence is saved in a temporary sequence (Q) to assess how far ahead the asset segment j and the asset segment i can be pushed in the temporary sequence without violating the one or more preferences associated with the target entity. Further the feasible sequence is saved in a temporary sequence (Q) to assess how far ahead the asset segment j and the asset segment i can be pushed in the temporary sequence without violating the one or more preferences associated with the source entity. Further there is more re-sequencing to further satisfy the one or more preferences associated with the target entity, however if the unsatisfied/violated one or more preferences associated with the target entity is saved as a user violation set. The a violation factor that represents a conflict between the one or more preferences associated with the source entity and the one or more preferences associated with the target entity Finally, after exiting the loop, all the temporary subsequences are concatenated to generate the final sequence. The algorithm for the feasible sequence technique for generating the feasible sequence (s) can be presented as shown below:

```
\begin[algorithm}
\normalsize
\textbf{Input:}
{\begin{itemize}
\item \textit{A} - Set of assets Ex: $A = \{a, b, c, d\}$
\item \textit{U} - Set of user preferences Ex: $U
     = \{(a, b), (c, a), (b, d)\}$
\item $s$
- A feasible sequence which is obtained using the feasible sequence generator.$ s
= \cup_{i
= 1}^K$, where $s[k]$ is the $k^{th}$ subsequence and $K$ is the number of subsequences.
     \item \begin{align*}
     \beta_{ij} & =
     \begin{cases}
     1 & \text{if dependency dictates that asset
          \textit{i} has to be viewed before \textit{j}} \\
     0 & \text{otherwise },
     \end{cases}
     \end{align*}
     \end{itemize} } \\
     \textbf{Output: }
     {
     \begin{itemize}
     \item $F$ - Final sequence of assets
     \item $V$ - Set of violated user preferences
     \end{itemize}
     }\\
     \State{$V = \{\}$}\\
     \For{each$(i, j) \in U$}
     {
     \State{Let $i$ be in subsequence $s[k1]$}\\
     \State{Let $j$ be in subsequence $s[k2]$}\\
     \If{$k1 \neq k2$}
     {
\State{Sequence all elements in $s[k2]$ immediately after $i$ in $s[k1]$}\\
     \State{Update $s[k1]$} \\
     \State{$s[k2] = \{\}$}
     }
     \Else{
     \If{$i$ appears before $j$ in $s[k1]$}
     {
     \State{-do nothing-}
     }
     \Else
     {
\State{Let
\textit{Q} be the sequences of assets between $j$ and $i$ in $s[k1]$ (including $j$ and $i$)}
\\
     \For{each $l_1 \in Q$}
     {
     \If{$\beta_{jl_1} = 1$}
     {
     \State{break}\\
     } }
     \For{each $l_2 \in Q$}
     {
     \If{$\beta_{l_2i} = 1$}
     {
     \State{break}\\
     }} }
     \State{Move $i$ after $l_2$ in $s[k1]$}\\
     \State{Move $j$ before $l_1$ in $s[k1]$}\\
     \If{$i$ appears before $j$ in updated $s[k1]$}
     {
     \State{-user preference is satisfied-}
     }
     \Else{
     $V = V \cup \{i,j\}$
     }}}}
     \State{$F = s[1]$}\\
     \For{$k \in \{2,3,..., K\}$}
     {
     $F.append(s[k])$
     } \end{algorithm}
```

Further upon generating the final sequence, the plurality of asset segments is arranged in an optimal sequence, wherein the optimal sequence comprises optimally re-sequencing the plurality of asset segments wherein the optimal sequence comprises optimally reshuffling the plurality of asset segments based on the final sequence and the feasible sequence that is generated based on the plurality of constraints of the plurality of asset segments. The plurality of asset segments is arranged in an optimal sequence and the target entity violation factor is displayed on the I/O interface 106 of system 100.

EXAMPLE

An example wherein a plurality of assets associated with different information related to privacy policies cookies & personal information along with the sub-segments is shared below in TABLE 6. Herein, it will be understood that the example provided in TABLE 6 is only for illustrative purposes and should not be construed as limiting to the embodiments.

TABLE 6

Example of asset segment with sub-asset segments of privacy policy

| Asset segments of Privacy Policy | Sub-asset segments |
|---|---|
| Personal Information | A1, A2, A3, A4 |
| Cookies | B1, B2, B3, B4, B5 |
| Third Party Advertisers | C1, C2, C3, . . . |
| Customer Choices | D1, D2, D3, . . . |
| Information Sharing | E1, E2, E3, . . . |
| Information Security | F1, F2, F3, . . . |
| Privacy Shield | G1, G2, G3, . . . |
| Accessible Information | H1, H2, H3, . . . |
| Children's Policies | I1, I2, . . . |

In an embodiment, the sub-assets segments are certain topics related to the asset segments. An example scenario is as shown below in TABLE 7, wherein the sub-asset segments of two asset segments are described. Herein, it will be understood that the example provided in TABLE 7 is only for illustrative purposes and should not be construed as limiting to the embodiments.

TABLE 7

Asset segment with sub-asset segments (descriptive) of privacy policy

| Asset segments of Privacy Policy | Sub-asset segments |
|---|---|
| Cookies | B1: What are Cookies? |
| | B2: Disabling Cookies |
| | B3: Features enabled by Cookies |
| | B4: Do we store Cookies? |
| | B5: How Cookies are stored? |
| Personal Information | A1: Need of collecting PII |
| | A2: Different types of PII collected |
| | A3: How we collect PII |
| | A4: What is personally identifiable information PII |
| Children Policies | I1: Can children access the services? |
| | I2: Advertisement specifications for children |
| | I3: Parents' consent requirements |
| | I4: Parent monitoring |
| | I5: Services available for children |
| | I6: Minimum age requirement |

For the example shared above, upon applying the proposed optimization techniques the sequence obtained is as follows:

In an embodiment, considering an asset segment—"cookies" with five sub-asset segments in Cookies to be represented as B1, B2, B3, B4 and B5, respectively. The pre-defined predecessor for cookies are as shown below in TABLE 8. The feasible sequence generation technique includes generating a set of revised predecessors for each of the asset segment and a set of revised successors for each of the asset segment using the pre-defined predecessors of the plurality of asset segments, as shown in TABLE 8. Herein, it will be understood that the example provided in TABLE 8 is only for illustrative purposes and should not be construed as limiting to the embodiments.

TABLE 8

Example of pre-defined predecessor and refined predecessor

| Sub-asset | Pre-defined Predecessor | Refined Predecessor |
|---|---|---|
| B1 | None | None |
| B2 | B1 | B1 |
| B3 | B1, B4 | B1, B4 |
| B4 | B1 | B1, |
| B5 | B1, B3 | B1, B3, B4 |

The pre-defined successor for cookies are as shown below in TABLE 9. The feasible sequence generation technique includes generating a set of revised predecessors for each of the asset segment and a set of revised successors for each of the asset segment using the pre-defined successors of the plurality of asset segments, as shown in TABLE 9. Herein, it will be understood that the example provided in TABLE 9 is only for illustrative purposes and should not be construed as limiting to the embodiments.

TABLE 9

Example of pre-defined successors and refined successors

| Sub-asset | Pre-defined Successor | Refined Successor |
|---|---|---|
| B1 | B2, B3, B4, B5 | B2, B3, B4, B5 |
| B2 | None | None |
| B3 | B5 | B5 |
| B4 | B3 | B3, B5 |
| B5 | None | None |

Generating a feasible sequence for the plurality of asset segments, through a feasible sequence generation technique based the one or more preferences associated with the source entity, a set of pre-defined predecessors of each asset segment and a set of pre-defined successors of each asset segment, where the feasible sequence comprises one or more sub-sequences as shown in TABLE 10. Herein, it will be understood that the example provided in TABLE 10 is only for illustrative purposes and should not be construed as limiting to the embodiments.

TABLE 10

Example of feasible sequence for the plurality of asset segments

| Feasible sequence of asset segments | Feasible sequence of sub-asset segments |
|---|---|
| Personal Information | A4. What is personally identifiable information PII? |

TABLE 10-continued

Example of feasible sequence for the plurality of asset segments

| Feasible sequence of asset segments | Feasible sequence of sub-asset segments |
|---|---|
| Cookies | A1. Need of collecting PII<br>A2. How we collect PII?<br>A3. Different types of PII collected<br>B1. What are Cookies?<br>B4. Do we store Cookies?<br>B3. Features enabled by Cookies<br>B5. How Cookies are stored?<br>B2. Disabling Cookies |
| Information Sharing | E1, E2, E3, . . . |
| Information Security | F1, F2, F3, . . . |
| Third Party Advertisers | C1, C2, C3, . . . |
| Accessible Information | H1, H2, H3, . . . |
| Customer Choices | D1, D2, D3, . . . |
| Children's Policies | I1. Can children access the services?<br>I6. Minimum age requirement<br>I3. Parents' consent requirements<br>I4. Parent monitoring<br>I5. Services available for children<br>I2. Advertisement specifications for children |
| Privacy Shield | G1, G2, G3, . . . |

Generating a final sequence for the plurality of asset segments through a sequence generation technique using the feasible sequences based on the one or more preferences associated with the target entity and the one or more preferences associated with the source entity, in TABLE 11. Herein, it will be understood that the example provided in TABLE 11 is only for illustrative purposes and should not be construed as limiting to the embodiments.

TABLE 11

Example of final sequence for the plurality of asset segments

| Final sequence of Asset segments of Privacy Policy | Final sequence of sub-asset segments |
|---|---|
| Personal Information | A4. What is personally identifiable information PII?<br>A1. Need of collecting PII<br>A2. Different types of PII collected<br>A3. How we collect PII? |
| Children's Policies | I1. Can children access the services?<br>I6. Minimum age requirement<br>I3. Parents' consent requirements<br>I4. Parent monitoring<br>I5. Services available for children.<br>I2. Advertisement specifications for children |
| Cookies | B1. What are Cookies?<br>B2. Disabling Cookies<br>B4. Do we store Cookies?<br>B5. How Cookies are stored?<br>B3. Features enabled by Cookies |
| Information Sharing | E1, E2, E3, . . . |
| Information Security | F1, F2, F3, . . . |
| Third Party Advertisers | C1, C2, C3, . . . |
| Accessible Information | H1, H2, H3, . . . |
| Customer Choices | D1, D2, D3, . . . |
| Privacy Shield | G1, G2, G3, . . . |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system that determines an optimal sequence/arrangement of a plurality of asset segments from a source entity based on a plurality of preferences associated with the source entity and a target entity. Further the disclosed system also determines a violation factor that represents a conflict between the one or more preferences associated with the source entity and the one or more preferences associated with the target entity while determining the optimal sequence for arrangement of a plurality of asset segments.

For example, in an embodiment the system optimally sequences the plurality of asset segments in several steps, wherein the several steps comprise of a feasible sequence generation technique and a sequence generation technique based on the one or more preferences associated with the target entity. The proposed techniques for sequencing utilize a set of pre-defined predecessors of each asset segment and a set of pre-defined successors of each asset segment, to re-sequenced the asset segments based on the feasible sequence generation technique and a sequence generation technique to finally arrive at an optimal sequence by considering the constraints or preferences associated with the organization as well as end users. The proposed feasible sequence generation technique and a sequence generation technique are inspired by greedy algorithm. Hence the present disclosure bridges a communication gap between privacy policy to the end users by displaying the most relevant privacy policy (that is mapped to a plurality of asset segments) in an optimal sequence by considering the constraints. Further the disclosed system also determines a violation factor that represents a conflict between the preferences associated with the source entity and the preferences associated with the target entity.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A processor-implemented method comprising:
   receiving an input associated with a privacy policy of a source entity, via a one or more hardware processors, the input comprising of a plurality of asset segments, one or more preferences associated with the source entity and one or more preferences associated with a target entity, wherein the plurality of asset segments comprise one of a set of audio-video templates, a set of audio templates, and a set of video template, and wherein each asset segment of the plurality of asset segments is mapped to the privacy policy of the source entity;
   generating a feasible sequence of the plurality of asset segments, by the one or more hardware processors, through a feasible sequence generation technique based the one or more preferences associated with the source entity, a set of pre-defined predecessors of each asset segment and a set of pre-defined successors of each asset segment, where the feasible sequence comprises one or more sub-sequences, wherein the feasible sequence generation technique comprises of:
      generating a set of revised predecessors for each of the asset segment and a set of revised successors for each of the asset segment using the set of pre-defined predecessors of the plurality of asset segments, the set of pre-defined successors of the plurality of asset segments and the one or more preferences associated with the source entity based on a predecessor and successor generation technique; and
      generating a set of feasible sequences of the plurality of asset segments using the set of revised predecessors, the set of revised successors and the one or more preferences associated with the source entity based a feasible sequence technique;
   generating a final sequence of the plurality of asset segments, by the one or more hardware processors, through a sequence generation technique using the set of feasible sequences based on the one or more preferences associated with the target entity and the one or more preferences associated with the source entity, wherein the sequence generation technique is a technique where each of the one or more sub-sequences of the feasible sequence is re-sequenced or merged with another sub-sequence based on the one or more preferences associated with the target entity and the one or more preferences associates with the source entity;
   generating an optimal sequence by re-sequencing the plurality of asset segments in the final sequence to satisfy the one or more preferences associated with the target entity; and
   displaying the plurality of asset segments in the optimal sequence and a violation factor, wherein the violation factor represents a conflict between the one or more preferences associated with the source entity and the one or more preferences associated with the target entity.

2. The method of claim 1, wherein the one or more preferences associated with the source entity comprises a plurality of source entity dependencies and a plurality of source entity user preference, and wherein the one or more preferences associated with the target entity comprises a plurality of target entity user preferences.

3. The method of claim 1, the set of pre-defined predecessors and the set of pre-defined successors is dynamically pre-defined for each input asset based on the one or more preferences associated with the source entity, wherein the set of pre-defined predecessors and the set of pre-defined successors are associated with the order in which each input asset is sequenced or positioned among the plurality of asset segments.

4. The method of claim 1, wherein the predecessor generation technique and the successor generation technique comprises:
   generating the set of revised predecessors for each of the asset segment by iteratively performing a comparison of each of the pre-defined predecessors of an asset segment with every pre-defined predecessor of each of the plurality of asset segments; and
   generating the set of revised successors for each of the asset segment by iteratively performing a comparison of each of the pre-defined successors of an asset segment with every pre-defined successor of each of the plurality of asset segments.

5. The method of claim 1, wherein the feasible sequence technique of the plurality of asset segments comprises generating one or more subsequence, wherein a subsequence of the one or more subsequences comprises the plurality of asset segments sequenced according to the set of revised predecessors and the set of revised successors.

6. A system, comprising:
an input/output interface;
one or more memories; and
one or more hardware processors, the one or more memories coupled to the one or more hardware processors, wherein the one or more hardware processors are configured to execute programmed instructions stored in the one or more memories, to:
receive an input associated with a privacy policy of a source entity, via a one or more hardware processors, the input comprising of a plurality of asset segments, one or more preferences associated with the source entity and one or more preferences associated with a target entity, wherein the plurality of asset segments comprise one of a set of audio-video templates, a set of audio templates, and a set of video template, and wherein each asset segment of the plurality of asset segments is mapped to the privacy policy of the source entity;
generate a feasible sequence of the plurality of asset segments, by the one or more hardware processors, through a feasible sequence generation technique based the one or more preferences associated with the source entity, a set of pre-defined predecessors of each asset segment and a set of pre-defined successors of each asset segment, where the feasible sequence comprises one or more sub-sequences, wherein the feasible sequence generation technique comprises of:
generate a set of revised predecessors for each of the asset segment and a set of revised successors for each of the asset segment using the set of pre-defined predecessors of the plurality of asset segments, the set of pre-defined successors of the plurality of asset segments and the one or more preferences associated with the source entity based on a predecessor and successor generation technique; and
generate a set of feasible sequences of the plurality of asset segments using the set of revised predecessors, the set of revised successors and the one or more preferences associated with the source entity based a feasible sequence technique;
generate a final sequence of the plurality of asset segments, by the one or more hardware processors, through a sequence generation technique using the set of feasible sequences based on the one or more preferences associated with the target entity and the one or more preferences associated with the source entity, wherein the sequence generation technique is a technique where each of the one or more sub-sequences of the feasible sequence is re-sequenced or merged with another sub-sequence based on the one or more preferences associated with the target entity and the one or more preferences associated with the source entity;
generating an optimal sequence by re-sequenceing the plurality of asset segments in the final sequence to satisfy the one or more preferences associated with the target entity; and
displaying the plurality of asset segments in the optimal sequence and a violation factor, wherein the violation factor represents a conflict between the one or more preferences assocated with the source entity and the one or more preferences associated with the target entity.

7. The system as claimed in claim 6, wherein the one or more hardware processors are configured by the instructions to dynamically pre-define the set of pre-defined predecessors and the set of pre-defined successors for each input asset based on the one or more preferences associated with the source entity, wherein the pre-defined predecessors and the pre-defined successors are associated with the order in which each input asset is sequenced or positioned among the plurality of asset segments.

8. The system as claimed in claim 6, wherein the one or more hardware processors are configured by the instructions to implement the predecessor and successor generation technique wherein:
generate a set of revised predecessors for each of the asset segment by iteratively performing a comparison of each of the pre-defined predecessors of an asset segment with every pre-defined predecessor of each of the plurality of asset segments; and
generate a set of revised successors for each of the asset segment by iteratively performing a comparison of each of the pre-defined successors of an asset segment with every pre-defined successor of each of the plurality of asset segments.

9. The system as claimed in claim 6, wherein the one or more hardware processors are configured by the instructions to implement the feasible sequence technique of the plurality of asset segments includes generating one or more subsequence, wherein the subsequence comprises of the plurality of asset segments sequenced according to the set of revised predecessors and the set of revised successors.

10. A non-transitory computer-readable medium having embodied thereon a computer readable, wherein the computer readable program, when executed by one or more hardware processors, cause:
receiving an input associated with a privacy policy of a source entity, via a one or more hardware processors, the input comprising of a plurality of asset segments, one or more preferences associated with the source entity and one or more preferences associated with a target entity, wherein the plurality of asset segments comprise one of a set of audio-video templates, a set of audio templates, and a set of video template, and wherein each asset segment of the plurality of asset segments is mapped to the privacy policy of the source entity;
generating a feasible sequence of the plurality of asset segments, by the one or more hardware processors, through a feasible sequence generation technique based the one or more preferences associated with the source entity, a set of pre-defined predecessors of each asset segment and a set of pre-defined successors of each asset segment, where the feasible sequence comprises one or more sub-sequences, wherein the feasible sequence generation technique comprises of:
generating a set of revised predecessors for each of the asset segment and a set of revised successors for each of the asset segment using the set of pre-defined predecessors of the plurality of asset segments, the set of pre-defined successors of the plurality of asset segments and the one or more preferences associated with the source entity based on a predecessor and successor generation technique; and
generating a set of feasible sequences of the plurality of asset segments using the set of revised predecessors, the set of revised successors and the one or more preferences associated with the source entity based a feasible sequence technique;
generating a final sequence of the plurality of asset segments, by the one or more hardware processors, through a sequence generation technique using the set of feasible sequences based on the one or more preferences associated with the target entity and the one or more preferences associated with the source entity, wherein the sequence generation technique is a technique where each of the one or more sub-sequences of the feasible sequence is re-sequenced or merged with another sub-sequence based on the one or more preferences associated with the target entity and the one or more preferences associated with the source entity;

generating an optimal sequence by re-sequencing the plurality of asset segments in the final sequence to satisfy the one or more preferences associated with the target entity; and displaying the plurality of asset segments in the optimal sequence and a violation factor, wherein the violation factor represents a conflict between the one or more preferences associated with the source entity and the one or more preferences associated with the target entity.

* * * * *